(12) United States Patent
Lam et al.

(10) Patent No.: US 8,780,118 B2
(45) Date of Patent: Jul. 15, 2014

(54) TECHNIQUES FOR SYNCHRONIZING HARDWARE ACCELERATED GRAPHICS RENDERING AND SURFACE COMPOSITION

(75) Inventors: Ioi Kim Lam, Mountain View, CA (US); Qiuyuan Yang, Milapitas, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 446 days.

(21) Appl. No.: 13/158,982

(22) Filed: Jun. 13, 2011

(65) Prior Publication Data
US 2012/0313951 A1    Dec. 13, 2012

(51) Int. Cl.
*G06T 13/00* (2011.01)
(52) U.S. Cl.
USPC ........................................................ 345/473
(58) Field of Classification Search
CPC ......... G06T 13/00; G06T 13/40; G06T 13/80; G06T 13/20; A63F 13/10
See application file for complete search history.

(56) References Cited

U.S. PATENT DOCUMENTS 6,396,473 B1 *   5/2002   Callahan et al. ............... 345/530
7,602,406 B2 * 10/2009   Gray et al. ..................... 345/634

\* cited by examiner

*Primary Examiner* — Kee M Tung
*Assistant Examiner* — Frank Chen
(74) *Attorney, Agent, or Firm* — Jefferson IP Law, LLP

(57) ABSTRACT

A method, a non-transitory computer readable medium having instructions recorded therein for performing the method, and processing device for rendering an animation for a screen. The method includes rendering a frame of animation of a screen, attaching a Move Surfaces at BufferSwap (MSBS) command to at least one surface to be aligned with the frame of animation, swapping the buffer of the frame of animation, updating at least one of a size and a location of the at least one surface having an attached MSBS command, and composing a scene including the contents of the at least one surface of which the at least one of the size and the location has been updated.

21 Claims, 3 Drawing Sheets

TECHNIQUES FOR SYNCHRONIZING HARDWARE ACCELERATED GRAPHICS RENDERING AND SURFACE COMPOSITION

BACKGROUND OF THE INVENTION

1. Field of the Invention

Aspects of the present invention relate to hardware accelerated graphics rendering and surface composition. More particularly, aspects of the present invention relate to techniques for synchronizing hardware accelerated graphics rendering and surface composition.

2. Description of the Related Art

A typical multi-window graphics system with hardware accelerated graphics includes two major components, namely a hardware Graphics Processing Unit (GPU) and a surface composer. A GPU renders into a surface. A typical surface is a rectangular graphics buffer. Typically, one surface corresponds to a window in a screen of a processing device. The surface composer composes multiple surfaces into the screen.

The typical multi-window graphics system with hardware accelerated graphics described above may encounter an out-of-sync problem for some types of animation. For example, the out-of-sync problem may be encountered for types of animation that require the graphics animation inside individual surfaces to be synchronized with the motion of the surfaces themselves. Herein, the types of animation where the graphics animation inside individual surfaces should be synchronized with the motion of the surfaces themselves are referred to as Sync Needed Animation. An example of Sync Needed Animation is described below.

An example of Sync Needed Animation is an "explosion of the windows" animation. In the "explosion of the windows" animation, a flaming explosion animation is rendered using Open Graphics Library (OpenGL) in a background surface. The background surface fills up the entire size of the screen of the processing device.

During the animation, a plurality of small windows "fly out" from the middle of the desktop screen. Each small window of the plurality of small windows is one surface. The "flying" motion of the small windows should be synchronized with the speed of the explosion animation. If the "flying" motion of the small windows is not synchronized with the speed of the explosion animation, the "window flying" motion looks disconnected from the explosion and thus appears unnatural to a user of the processing device.

Another problem encountered with the above-described typical multi-window graphics system with hardware accelerated graphics is the alignment of flash windows with surrounding content on a scrolling web browser page.

When a web browser page is scrolled, a scrolling animation is rendered using OpenGL in a background surface. During this animation, a small flash window, which is also a surface, should move together with the surrounding web page content. When the motion of the flash window is not synchronized with the scrolling animation, the flash window appears to the user as "fluttering around" the surrounding web page content.

Accordingly, there is a need for techniques that address the out-of-sync problem for the Sync Needed Animations in the multi-window graphics system with hardware accelerated graphics.

The above information is presented as background information only to assist with an understanding of the present disclosure. No determination has been made, and no assertion is made, as to whether any of the above might be applicable as Prior Art with regard to the present invention.

SUMMARY OF THE INVENTION

An aspect of the present invention is to address at least the above-mentioned problems and/or disadvantages and to provide at least the advantages described below. Accordingly, an aspect of the present invention is to provide techniques that address an out-of-sync problem for Sync Needed Animations in a multi-window graphics system with hardware accelerated graphics.

Another aspect of the present invention is to provide techniques for synchronizing hardware accelerated graphics rendering and surface composition.

In accordance with an aspect of the present invention, a method for rendering an animation for a screen of a processing device is provided. The method includes rendering a frame of animation of a screen, attaching a Move Surfaces at BufferSwap (MSBS) command to at least one surface to be aligned with the frame of animation, swapping the buffer of the frame of animation, updating at least one of a size and a location of the at least one surface having an attached MSBS command, and composing a scene including the contents of the at least one surface of which the at least one of the size and the location has been updated.

In accordance with another aspect of the present invention, a non-transitory computer readable recoding medium having instructions recorded therein for execution by at least one processor of a processing device to thereby cause the at least one processor to perform a method for rendering an animation for a screen of the processing device is provided. The method includes rendering a frame of animation of a screen, attaching a MSBS command to at least one surface to be aligned with the frame of animation, swapping the buffer of the frame of animation, updating at least one of a size and a location of the at least one surface having an attached MSBS command, and composing a scene including the contents of the at least one surface of which the at least one of the size and the location has been updated.

In accordance with yet another aspect of the present invention, a processing device for rendering an animation for a screen is provided. The processing device includes at least one processor and a memory. The memory includes instructions for rendering a frame of animation of a screen, instructions for attaching a MSBS command to at least one surface to be aligned with the frame of animation, instructions for swapping the buffer of the frame of animation, instructions for updating at least one of a size and a location of the at least one surface having an attached MSBS command, and instructions for composing a scene including the contents of the at least one surface of which the at least one of the size and the location has been updated.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

Figure 1:
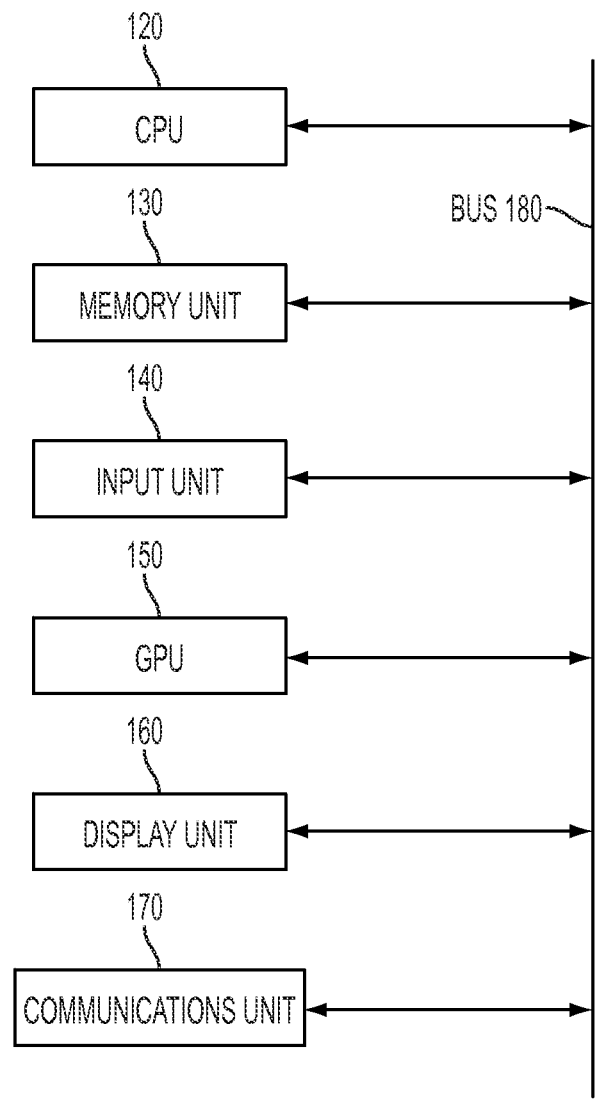
FIG. 1 is a block diagram of a device which may be used to implement exemplary embodiments of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention include techniques for hardware accelerated graphics rendering and surface composition. More specifically, exemplary embodiments of the present invention include techniques for synchronizing hardware accelerated graphics rendering and surface composition. Certain techniques described herein address an out-of-sync problem for Sync Needed Animations in a multi-window graphics system with hardware accelerated graphics.

It should be understood that the following description might refer to terms utilized in various standards merely for simplicity of explanation. For example, the following description may refer to terms utilized in the Open Graphics Library (OpenGL) or other standards. However, this description should not be interpreted as being limited to any one standard. Independent of the mechanism used for synchronizing hardware accelerated graphics rendering and surface composition, it may be advantageous for that mechanism to conform to a standardized mechanism.

The following exemplary embodiments of the present invention are described as applied to a "processing device." It is to be understood that this is merely a generic term and that the invention is equally applicable to any of a Personal Computer (PC), a mobile phone, a palm sized PC, a netbook, a Personal Digital Assistant (PDA), a Hand-held PC (HPC), a smart phone, a wireless Local Area Network (LAN) terminal, and the like. Accordingly, use of the term "processing device" should not be used to limit application of the present inventive concepts to any certain type of apparatus or device.

An example of a processing device which may be used to implement exemplary embodiments of the present invention is described below with reference to FIG. 1

FIG. 1 is a block diagram of a processing device which may be used to implement exemplary embodiments of the present invention.

Referring to FIG. 1, the processing device may include a Central Processing Unit (CPU) 120, a memory unit 130, an input unit 140, a Graphics Processing Unit (GPU) 150, a display unit 160, a communications unit 170, and a bus 180. According to exemplary embodiments of the present invention, the processing device may include additional and/or different units, or omit any number of the units shown in FIG. 2. Similarly, the functionality of two or more units may be integrated into a single component.

The CPU 120 may include at least one of a processor, a microprocessor, and another type of control device that interprets and executes instructions. The CPU 120 may control overall operations of the processing device. The operations of the CPU 120 may include any of the operations explicitly or implicitly described herein as being performed by an animation program, surface composer, CPU or GPU.

The memory unit 130 may be a Random Access Memory (RAM), another type of dynamic storage device that stores at least one of information and instructions for the CPU 120, a Read Only Memory (ROM), another type of static storage device that stores at least one of static information and instructions for the CPU 120, or any combination thereof. The memory unit 130 may also store temporary variables or other intermediate information used during the execution of instructions by CPU 120. The memory unit 130 may function as a buffer. The memory unit 130 may be composed of or include a removable memory unit. The memory unit 130 may be composed of or include a remote memory unit that is accessed through the communications unit 170.

The input unit 140 receives input from a user of the processing device. The input unit 140 may be configured as a component of the display unit 160, as described below. The input unit 140 may also be configured as a keypad or a plurality of keys to receive input from the user. The input unit 140 may be external to the processing device.

The GPU 150 may include at least one graphics processor for processing data and presenting a graphics image. The operations of the GPU 150 may include any of the operations explicitly or implicitly described herein as being performed by an animation program, surface composer, CPU or GPU.

The display unit 160 displays information to the user of the processing device. The display unit 160 may be provided as a Liquid Crystal Display (LCD), an Organic Light Emitting Diode (OLED), etc. In this case, the display unit 160 may include a controller for controlling the display unit, a video memory in which image data is stored and a display element. If the display unit 160 is provided as a touch screen, the display unit 160 may perform a part or all of the functions of the input unit 140. The display unit 160 may display a composed scene to the user of the processing device. The display unit 160 may be external to the processing device.

The communications unit 170 is configured to include at least one of a wireless communication device and a wired communication device.

The bus 180 may be a communications interface that enables communication between one or more of the CPU 120, the memory unit 130, the input unit 140, the GPU 150, the display unit 160, and the communications unit 170.

The processing device may perform functions in response to the CPU 120 executing sequences of instructions contained in a non-transitory machine-readable medium, such as, for example, the memory unit 130, or other non-transitory media. Such instructions may be read into the memory unit 130 from another non-transitory machine-readable medium or from a separate memory unit via the communications unit 170.

As indicated above, Sync Needed Animations are a type of animation where the graphics animation inside individual surfaces should be synchronized with the motion of the surfaces themselves. An example of the components and their relationships related to Sync Needed Animation is described below with reference to FIG. 2.

Figure 2:
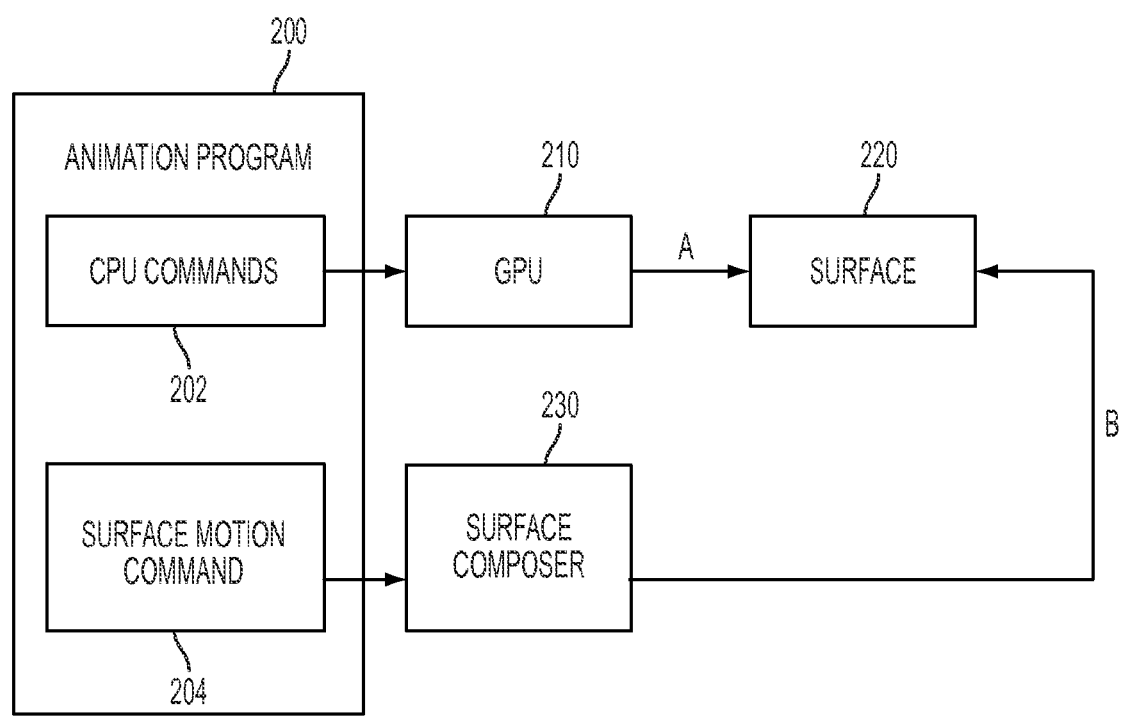
FIG. 2 illustrates a block diagram of components and their relationships, which are related to Sync Needed Animation, according to an exemplary embodiment of the present invention.

FIG. 2 illustrates a block diagram of components and their relationships, which are related to Sync Needed Animation, according to an exemplary embodiment of the present invention.

Referring to FIG. 2, an animation program 200, a GPU 210, a surface 220, and a surface composer 230. According to exemplary embodiments of the present invention, the components and their relationships which are related to Sync Needed Animation may include additional and/or different elements or relationships. For example, while only one surface 220 is shown in FIG. 2, exemplary embodiments of the present invention may be implemented with a plurality of surfaces. Similarly, the functionality of two or more elements may be integrated into a single element.

The animation program 200 is one of generated and modified so as to include instructions for rendering an animation for a screen of the processing device. The animation program 200 includes GPU commands 202 that are sent to the GPU 210 and a surface motion command 204 that is sent to surface composer 220. The surface motion command 204 is also referred to herein as a Move Surfaces at BufferSwap (MSBS) command.

The GPU 210 renders one frame of animation in response to the receipt of one of the GPU commands 202. The GPU 210 outputs the rendered animation to the surface 230. The output of the rendered animation to the surface 230 by the GPU 210 is designated as (A). In addition, the GPU 210 swaps the buffer of the one frame of animation in response to the receipt of one of the GPU commands 202.

The surface 220 receives the surface motion command 204 that are executed when the surface's buffer has been swapped.

The surface composer 230 is notified when a surface's buffer has been swapped. When the surface composer 230 is notified that a surface's buffer has been swapped, the surface composer 230 checks each surface 220 to determine which surface 220 has an attached surface motion command 204. For any surface 220 having an attached surface motion command 204, the surface composer 230 updates at least one of the size and the location of the corresponding surface 220. The updating of the at least one of the size and the location of the corresponding surface 220 is designated as (B).

Although not shown in FIG. 2, the swapped surface contents are composed with all other surfaces (which are resized and/or moved to their intended new location) onto the screen. Accordingly, (A) and (B) are synchronized.

Figure 3:
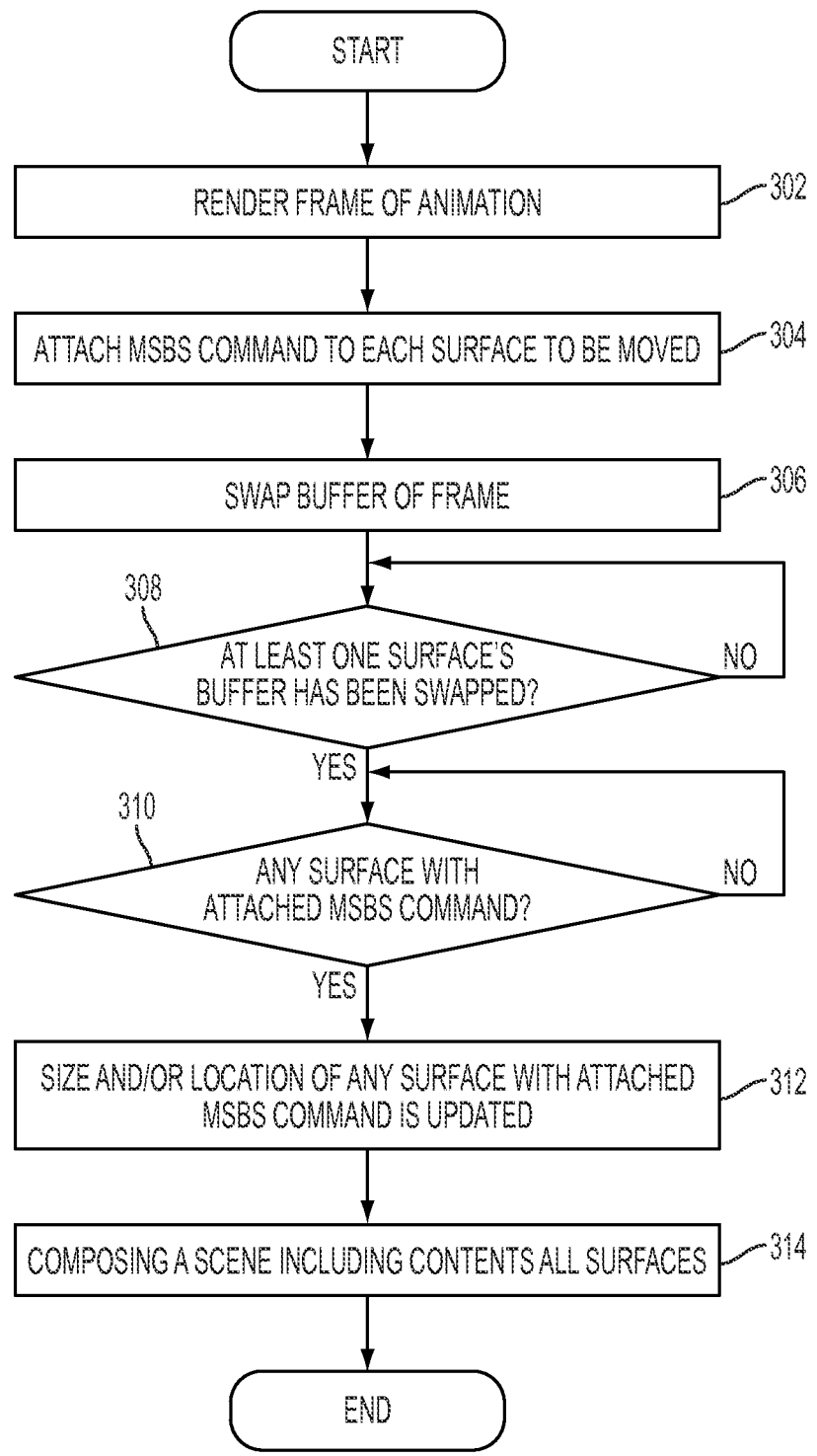
FIG. 3 illustrates a flowchart of a method for synchronizing surface motion with Graphics Processing Unit (GPU) rendering according to an exemplary embodiment of the present invention.

FIG. 3 illustrates a flowchart of a method for synchronizing surface motion with GPU rendering according to an exemplary embodiment of the present invention.

Referring to FIG. 3, in step 302, an animation program sends a GPU command to render one frame of animation. In step 304, a MSBS command is sent to each surface to be moved that is to be aligned with the one frame of animation. In step 306, a GPU command is sent to swap the buffer of the one frame of animation. In step 308, the surface composer determines whether it is notified that at least one surface's buffer has been swapped. When the surface composer is notified that at least one surface's buffer has been swapped, the surface composer checks each surface to determine if the surface has an attached MSBS command in step 310. When the surface composer determines that a surface has an attached MSBS command, at least one of the size and the location of the corresponding surface is updated in step 312. In step 314, the newly swapped surface's contents are composed with all other surfaces (which are resized and/or moved to their intended new location) onto the screen.

By performing the method described above, surface motion may be synchronized with GPU rendering.

Certain aspects of the present invention may also be embodied as computer readable code (i.e., instructions) on a non-transitory computer readable recording medium. A computer readable recording medium is any data storage device that can store data, which can be thereafter read by a computer system. Examples of the computer readable recording medium include ROM, RAM, CD-ROMs, magnetic tapes, floppy disks, optical data storage devices, any type of memory described above with respect to memory unit 130 of FIG. 1, etc. The computer readable recording medium can also be distributed over network coupled computer systems so that the computer readable code is stored and executed in a distributed fashion. Also, functional programs, code, and code segments for accomplishing the present invention can be easily construed by programmers skilled in the art to which the present invention pertains.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for rendering an animation for a screen of a processing device, the method comprising:
   rendering a frame of animation of a screen;
   attaching a Move Surfaces at BufferSwap (MSBS) command to at least one surface to be aligned with the frame of animation;
   swapping the buffer of the frame of animation;
   updating at least one of a size and a location of the at least one surface having an attached MSBS command; and
   composing a scene including contents of the at least one surface of which the at least one of the size and the location has been updated, wherein the contents are synchronized with a change in the at least one of the size and the location of the at least one surface that has been updated.

2. The method of claim 1, wherein the rendering of the frame of animation comprises rendering the frame of animation in response to a Graphics Processing Unit (GPU) command.

3. The method of claim 1, wherein the swapping of the buffer of the frame of animation comprises swapping of the buffer of the frame of animation in response to a Graphics Processing Unit (GPU) command.

4. The method of claim 1, wherein the updating of the at least one of the size and the location of the at least one surface having the attached MSBS command comprises:
    checking each of a plurality of surfaces to determine which of the plurality of surfaces is the at least one surface having the attached MSBS command; and
    updating the at least one of the size and the location of the at least one surface determined to have the attached MSBS command.

5. The method of claim 4, wherein the checking and the updating is performed by a surface composer.

6. The method of claim 1, wherein the updating of the at least one of the size and the location of the at least one surface having the attached MSBS command is performed after a surface composer is notified that the buffer of the frame of animation has been swapped.

7. The method of claim 1, further comprising presenting the scene as the screen of the processing device.

8. A non-transitory computer readable recoding medium having instructions recorded therein for execution by at least one processor of a processing device to thereby cause the at least one processor to perform a method for rendering an animation for a screen of the processing device, the method comprising:
    rendering a frame of animation of a screen;
    attaching a Move Surfaces at BufferSwap (MSBS) command to at least one surface to be aligned with the frame of animation;
    swapping the buffer of the frame of animation;
    updating at least one of a size and a location of the at least one surface having an attached MSBS command; and
    composing a scene including contents of the at least one surface of which the at least one of the size and the location has been updated, wherein the contents are synchronized with a change in the at least one of the size and the location of the at least one surface that has been updated.

9. The non-transitory computer readable recoding medium of claim 8, wherein the rendering of the frame of animation comprises rendering the frame of animation in response to a Graphics Processing Unit (GPU) command.

10. The non-transitory computer readable recoding medium of claim 8, wherein the swapping of the buffer of the frame of animation comprises swapping of the buffer of the frame of animation in response to a Graphics Processing Unit (GPU) command.

11. The non-transitory computer readable recoding medium of claim 8, wherein the updating of the at least one of the size and the location of the at least one surface having the attached MSBS command comprises:
    checking each of a plurality of surfaces to determine which of the plurality of surfaces is the at least one surface having the attached MSBS command; and
    updating the at least one of the size and the location of the at least one surface determined to have the attached MSBS command.

12. The non-transitory computer readable recoding medium of claim 11, wherein the checking and the updating is performed by a surface composer.

13. The non-transitory computer readable recoding medium of claim 8, wherein the updating of the at least one of the size and the location of the at least one surface having the attached MSBS command is performed after a surface composer is notified that the buffer of the frame of animation has been swapped.

14. The non-transitory computer readable recoding medium of claim 8, wherein the method further comprises presenting the scene as the screen of the processing device.

15. A processing device for rendering an animation for a screen, the processing device comprising:
    at least one processor; and
    a memory, the memory comprising:
        instructions for rendering a frame of animation of a screen,
        instructions for attaching a Move Surfaces at BufferSwap (MSBS) command to at least one surface to be aligned with the frame of animation,
        instructions for swapping the buffer of the frame of animation,
        instructions for updating at least one of a size and a location of the at least one surface having an attached MSBS command, and
        instructions for composing a scene including contents of the at least one surface of which the at least one of the size and the location has been updated, wherein the contents are synchronized with a change in the at least one of the size and the location of the at least one surface that has been updated.

16. The processing device of claim 15, wherein the instructions for the rendering of the frame of animation comprises instructions for rendering the frame of animation in response to a Graphics Processing Unit (GPU) command.

17. The processing device of claim 15, wherein the instructions for the swapping of the buffer of the frame of animation comprises instructions for swapping of the buffer of the frame of animation in response to a Graphics Processing Unit (GPU) command.

18. The processing device of claim 15, wherein the instructions for the updating of the at least one of the size and the location of the at least one surface having the attached MSBS command comprises:
    instructions for checking each of a plurality of surfaces to determine which of the plurality of surfaces is the at least one surface having the attached MSBS command; and
    instructions for updating the at least one of the size and the location of the at least one surface determined to have the attached MSBS command.

19. The processing device of claim 18, wherein instructions for the checking and the updating comprises instructions for performing the checking and the updating by a surface composer.

20. The processing device of claim 15, wherein the instructions for the updating of the at least one of the size and the location of the at least one surface having the attached MSBS command comprise instructions for the updating of the at least one of the size and the location of the at least one surface having the attached MSBS command to be performed after a surface composer is notified that the buffer of the frame of animation has been swapped.

21. The processing device of claim 15, wherein the memory further comprises instructions for presenting the scene as the screen of the processing device.

* * * * *